(12) United States Patent
Zivic

(10) Patent No.: US 6,395,605 B1
(45) Date of Patent: May 28, 2002

(54) MULTIFUNCTIONAL PROTECTIVE COMPONENT

(75) Inventor: Zoran Zivic, Medvode (SI)

(73) Assignee: Keko-Varicon, Zuzemberk (SI)

( * ) Notice: Subject to any disclaimer, the term of this patent is extended or adjusted under 35 U.S.C. 154(b) by 0 days.

(21) Appl. No.: 09/579,153

(22) Filed: May 25, 2000

Related U.S. Application Data

(62) Division of application No. 09/101,521, filed as application No. PCT/SI97/00030 on Nov. 10, 1997, now Pat. No. 6,328,176.

(30) Foreign Application Priority Data

Nov. 11, 1997 (SI) .............................................. P-9600330

(51) Int. Cl.$^7$ .......................................... H01L 21/8234
(52) U.S. Cl. ....................... 438/275; 438/104; 438/106; 438/237; 438/238; 438/381
(58) Field of Search ................................. 438/275, 104, 438/106, 237, 238, 239, 240, 381

(56) References Cited

FOREIGN PATENT DOCUMENTS

| JP | 02105404 | 4/1990 | ............ H01G/4/12 |
| JP | 02304910 | 12/1990 | ............ H01G/4/40 |
| JP | 06283301 | 10/1994 | ............ H01C/7/00 |

*Primary Examiner*—Long Pham
(74) *Attorney, Agent, or Firm*—Timothy J Ziolkowski; Cook & Franke SC

(57) ABSTRACT

A method of making a multifunctional protective component is disclosed. The method includes plastering a suspension comprising a mixture of glass dust, binder, and solvent onto a multilayer ZnO polycrystalline diode chip, multilayer self-limiting condenser chip, or a multilayer ceramic condensor chip. A sandwich structure is then formed by placing the non-plastered chips onto the plastered chip followed by scorching of the sandwich structure. A pair of uninterrupted outer electrodes are then formed from a paste of Ag or AgPd. The paste is then scorched on the pair of uninterrupted outer electrodes.

6 Claims, 1 Drawing Sheet

MULTIFUNCTIONAL PROTECTIVE COMPONENT

CROSS-REFERENCE TO RELATED APPLICATION

This application is a divisional of U.S. application Ser. No. 09/101,521, filed Nov. 12, 1998 now U.S. Pat. No. 6,328,176, entitled Multifunctional Protective Component, which claims the benefit of International Application Serial No. PCT/SI97/00030, filed Nov. 10, 1997 and Slovenia Application Serial No. P-9600330, filed Nov. 11, 1996.

FIELD OF INVENTION

Subject of the present invention belongs to the field of protective electronic elements, used in safeguarding of other electronic elements and devices against voltage and current strokes, and against high and low-frequency disturbances.

TECHNICAL PROBLEM

Miniaturisation and increase of complexity of contemporary electronic elements and systems, as well as their increasingly wider application simultaneously increase their sensitivity to electronic discharge (ESD), voltage excess and strokes and frequency disturbances. These phenomena may disable normal functioning of separate components, decrease their stability and reliability and may even destroy them. In this way above phenomena jeopardise normal functioning of very complex and expensive electronic systems Sources of these phenomena may be various. For instance the largest source of electrostatic discharge is man itself in the process of manipulation with electronic devices. Most typical source of voltage strokes is lightning, which induces charge in electrical and telecommunication lines, this charge being transferred through the lines to electronic elements. And some of electronic elements themselves (e.g. electromotor, relay) induce disturbances of various frequencies and emit them in their closest surrounding. Thus each separate electronic component and its part shall be protected with special components that provide such protection. On the other hand this means that disturbance emission shall be prevented at the source.

Only use of components, with following properties may provide protection against ESD and voltage strokes: non-linear I-U characteristic, short response time and ability to absorb larger amounts of energy. Such characteristics are available in some elements, like Zener diode, multilayer ZnO polycrystalline diode (Varicon), varistor, and condensers with varistor characteristic or self-limited breakthrough.

The simplest elements for protection against frequency disturbances are condensers with capacitance up to do 100 nF for high frequencies and in case of lower or radio frequencies with capacitance up to 2000 nF.

Consequently it is clear that in order to protect against all mentioned undesired phenomena, such protective component shall have all required properties: non-linear I-U characteristic, short response time, ability to absorb larger amount of energy, and adjustable capacitance in range from 10 to 2000 nF. Beside that it must be smaller than any existing solutions and shall offer surface mounting option with terminal leads.

Subject of this invention, multifunctional component has exactly such properties.

STATE OF ART

Beside the most expensive solution, namely use of two discrete elements in parallel electrical connection e.g. combinations Zener diode—condenser or varistor-condenser, there are some other contemporary solutions one of which is condenser with varistor properties as described in European Patent 418394A. Mentioned condenser is based on $SrTiO_3$, which provides high value of dielectric constant ($\epsilon > 20000$). Multilayer manufacturing technology provides wide scope of capacitance (10–2000 nF) at relatively small dimensions. However its worst side is, bad varistor characteristic and low value of non-linearity coefficient, soft knee and also high leakage current, high value of breakthrough voltage temperature coefficient and very narrow range of operating voltage. Further more materials for manufacturing such elements and production technology are very expensive. In U.S. Pat. No. 5,146,200 hybrid bond between multilayer chip varistor and multilayer chip condenser is disclosed. Physical bond of these two elements is achieved with gluing and parallel electrical connection is achieved with soldering.

Components as self-limiting multilayer condenser as shown in U.S. Pat. No. 4,729,058 and multilayer ZnO polycrystalline diode (Varicon diode) have very non-linear I-U characteristic and high self capacitance, which may within real dimensions reach up to 100 nF. In that way these two mentioned components provide protection against ESD and voltage strokes and effectively filter high frequency disturbances, but not low frequency disturbances.

BRIEF DESCRIPTION OF THE DRAWINGS

The drawings illustrate one preferred embodiment presently contemplated for carrying out the invention.

DESCRIPTION OF INVENTION

New multifunctional component is based on the following facts:

self-limiting multilayer condenser and Varicon diode have such properties, which provide effective protection against ESD and voltage strokes in voltage range from 4 to 150 V contemporary commercially available chip condensers have very high capacitance while dimensions are small both components have similar shape and similar dimensions.

Present invention proves that low temperature scorching provides possibility to create monolith element from two discrete elements, this newly created element preserving all unchanged functions of both discrete elements, which are mutually electrically parallel connected in new element.

As mentioned above, two discrete components are used to produce this new component. One of them must provide good ESD protection and good protection against voltage strokes. To meet these demands self-limiting condenser or Varicon diode may be used, both have excellent properties of protective component.

Second component only completes already high self capacitance of Varicon diode or self-limiting condenser up to preferred value, which is necessary for successful protection against high or low frequency, disturbances. For this purposes use of multilayer ceramic condenser is preferred.

Ceramic condenser provides desired capacitance, even up to 2000 nF and is manufactured in similar shapes and dimensions as Varicon diode or self-limiting condenser.

Both elements to bond shall have equal planar dimensions (wideness and length) and their largest sides must be even.

Figure 1:
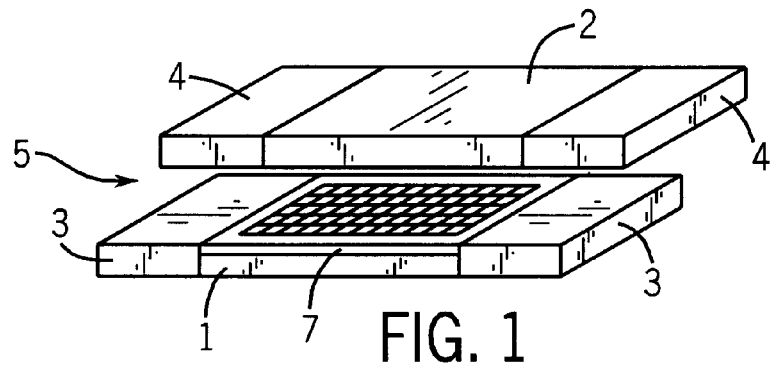
FIG. 1 is an exploded perspective view of a diode chip and a condenser chip.
Figure 2:
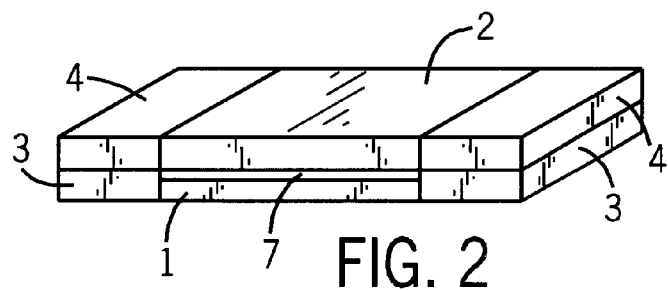
FIG. 2 is a perspective view of a diode chip and a condensor chip of FIG. 1 shown in a layered embodiment.

FIG. 1 shows Varicon diode chip (1) and condenser chip (2), each separately. As shown in FIG. 1, both components have same shape, equal planar dimensions, and on their shortest sides outer silver electrodes (3) in (4), which are already formed to allow electrical checking of both discrete components. Physical bond between two chips is made in such manner, that thin layer of suspension is brought on only one of two largest area of Varicon diode or condenser, in such way to cover whole area of the chip between two electrodes (5). Suspension is composed from dust of low temperature high resistant glass (frite), with temperature of glassification between 500° and 800° C., binder and solvent, which allow glass (frite) to be placed to the chip surface with printing, brush or in some other manner. Thickness of the suspension layer brought to the chip surface is between 10 and 500 $\mu$tm. Immediately after suspension is placed, second unplastered chip is placed with its larger side on the plastered side of the first chip in such manner that all edges are even, and their outer electrodes (3) in (4) fall in, and lay one upon another on both sides of the chips, as shown in FIG. 2. Both chips with glass inter layer form sandwich structure. So placed chips are than scorched at temperature between 5000 in 800° C. Binder and solvent evaporate at lower temperatures so only glass remains between chips (1) in (2). At certain temperature glass liquefies and diffuses in bodies of both components. Depth of diffusion may be controlled via glassification parameters (time and temperature) to ensure that glass will not diffuse to inner electrodes depth. In certain temperature range glass turns into thin amorphous layer with good mechanical, heat and insulating properties, after cooling. Glass layer is very good bound with both chips, due diffusion into both chip bodies. In that way, with glass layer, very good mechanical bond between both elements is achieved, and the surface between both elements has no porosity. Therefore we may say, that with glass, one monolith element composed of two discrete elements is created from two discrete elements.

Figure 3:
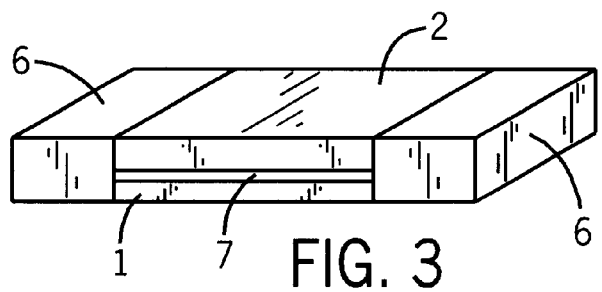
FIG. 3 is a perspective view of the layered diode chip and condenser chip of FIG. 2 having outer electrodes thereon in accordance with the present invention.
Figure 4:
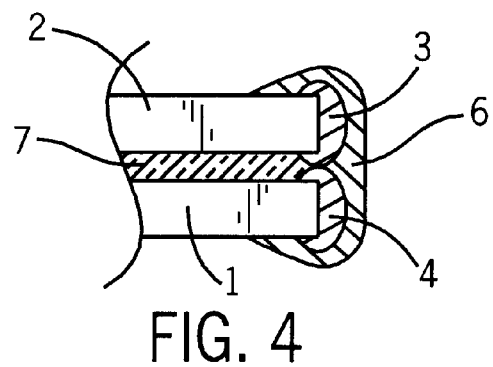
FIG. 4 is a cross-sectional view of a portion of the layered diode chip and condenser chip.

Regardless to the fact that outer electrodes of both chips are in physical contact, we may still not claim that reliable electric connection between them is achieved. Therefore so formed composition—monolith is repeatedly metallised with Ag or AgPd paste in such manner, that both smaller sides are plunged to certain depth into Ag or AgPd paste, and uninterrupted outer electrodes (6) of new component are created, both being at the same time in contact with both outer electrodes of both chips on the inner side. After this paste is scorched at the temperature from 5500 to 850° C., reliable electric contact, and parallel electrical connection between Varicon diode and ceramic condenser. This monolithic structure is best shown in FIG. 3 and FIG. 4, which is a cross-sectional view of a portion of that shown in FIG. 3.

When AgPd is used as second electrode paste, new chip (e.g. protective multifunctional protective component) is suitable for surface mounting.

If component with terminal leads is desired, second metallisation will be performed with Ag paste. So achieved component is placed between terminal leads, which will be finally metallurgical and electrical connected with outer electrodes in soldering process. Additional moulding into epoxy resins provides standard shapes of components with terminal leads.

EXAMPLE

Using self-limiting condensers and Varicon Diodes on one side and multilayer condenser on other side, varieties of multifunction protective components were made, using above described technique. Some of results are shown in table 1.

TABLE 1

| Chip dimensions (mm) | Un (V( ) | α 1–10 mA | $I_{max}$ (8/20 $\mu$s) (A) | C (1 kHz) (nF) |
|---|---|---|---|---|
| 3.2 × 2.5 | 4 | 32 | 50 | 33 |
|  | 15 | 29 | 100 | 33 |
|  | 22 | 28 | 250 | 47 |
| 5.7 × 5.0 | 27 | 28 | 500 | 1000 |
|  | 27 | 27 | 1000 | 680 |
|  | 33 | 35 | 2000 | 470 |
|  | 33 | 35 | 2000 | 1500 |

Un - breakdown voltage 1 mA
α - non-linearity coefficient
$I_{max}$ - Higher impulse current, without consequences for component
C - capacitance measured at value of 1 kHz

What is claimed is:

1. A method of making a multifunctional protective component comprising the steps of:
    a) providing one of a multiplayer ZnO polycrystalline diode chip and a multilayer self-limiting condensor chip, each chip including a first and a second end, each end having an outer electrode attached there;
    b) providing a multiplayer ceramic condensor chip, each chip including a first and a second end, each end having an outer electrode attached thereto;
    c) providing a suspension comprising a mixture of glass dust, binder and solvent;
    d) plastering the suspension onto one of the chips;
    e) forming a sandwich structure by placing the other of the chips onto the plastered chip;
    f) scorching the sandwich structure;
    g) forming a pair of uninterrupted outer electrodes with a past formed from one of Ag and AgPd; and
    h) scorching the paste on the pair of uninterrupted outer electrodes.

2. The method of claim 1, wherein each chip further includes a first end and a second end, each end having an outer electrode attached thereto, and wherein forming the pair of uninterrupted outer electrodes includes plunging the chip outer electrodes into one of the Ag paste and the AgPd paste.

3. The method of claim 1, wherein the suspension is plastered onto one of the chips to a thickness between 10 and 500 microns and wherein the plastering step is accomplished by one of printing and brushing the suspension, and wherein the suspension includes a relatively high resistance low temperature glass frite.

4. The method of claim 1, wherein the forming of the sandwich structure occurs such that all edges of the chips are even with respect to one another and such that the outer electrodes of one chip are in contact with outer electrodes of the other chip.

5. The method of claim 1, further comprising the step of removing the binder and the solvent from the suspension, and wherein after the removal step the scorching of the sandwich structure step occurs at a temperature between 500° and 800° C.

6. The method of claim 1, further comprising the step of metalizing the chip outer electrodes with one of the Ag paste and the AgPd paste to form the pair of uninterruptible outer electrodes, and wherein the scorching of one of the Ag paste and the AgPd paste occurs at a temperature between 500° and 850° C. in order to provide a parallel electrical connection between both chips.

* * * * *

UNITED STATES PATENT AND TRADEMARK OFFICE
CERTIFICATE OF CORRECTION

PATENT NO. : 6,395,605 B1
DATED : May 28, 2002
INVENTOR(S) : Zoran Zivic

It is certified that error appears in the above-identified patent and that said Letters Patent is hereby corrected as shown below:

Column 3,
Line 26, delete "5000" and substitute therefore -- 500 --;
Line 49, delete "5500" and substitute therefore -- 500 --;

Signed and Sealed this

Twenty-sixth Day of November, 2002

*Attest:*

*Attesting Officer*

JAMES E. ROGAN
*Director of the United States Patent and Trademark Office*